(12) United States Patent  
Rittle et al.

(10) Patent No.: US 7,688,793 B2
(45) Date of Patent: Mar. 30, 2010

(54) WIRELESS SENSOR NODE GROUP AFFILIATION METHOD AND APPARATUS

(75) Inventors: Loren J. Rittle, Naperville, IL (US); Jason B. Le Brun, Sacramento, CA (US)

(73) Assignee: Motorola, Inc., Schaumburg, IL (US)

( * ) Notice: Subject to any disclaimer, the term of this patent is extended or adjusted under 35 U.S.C. 154(b) by 339 days.

(21) Appl. No.: 11/278,702

(22) Filed: Apr. 5, 2006

(65) Prior Publication Data

US 2007/0266078 A1 Nov. 15, 2007

(51) Int. Cl.
H04Q 7/24 (2006.01)
(52) U.S. Cl. .............. 370/338; 370/328; 370/335; 455/7; 340/571.1
(58) Field of Classification Search .......... 370/310, 370/335, 390, 338, 328; 709/224; 455/7; 340/571.1
See application file for complete search history.

(56) References Cited

U.S. PATENT DOCUMENTS

| | | | |
|---|---|---|---|
| 5,745,483 A * | 4/1998 | Nakagawa et al. | 370/335 |
| 5,802,367 A | 9/1998 | Held et al. | |
| 6,360,264 B1 | 3/2002 | Rom | |
| 6,421,731 B1 | 7/2002 | Ciotti et al. | |
| 6,813,631 B2 | 11/2004 | Pouchak et al. | |
| 6,817,016 B1 | 11/2004 | Wegman et al. | |
| 6,973,309 B1 | 12/2005 | Rygula et al. | |
| 6,990,316 B2 | 1/2006 | Heinonen et al. | |
| 7,020,701 B1 * | 3/2006 | Gelvin et al. | 709/224 |
| 7,408,911 B2 | 8/2008 | Joshi | |
| 2003/0005167 A1 | 1/2003 | Khare et al. | |
| 2003/0065743 A1 | 4/2003 | Jenny et al. | |
| 2004/0064351 A1 | 4/2004 | Mikurak | |
| 2004/0098447 A1 | 5/2004 | Verbeke et al. | |
| 2004/0133640 A1 | 7/2004 | Yeager et al. | |
| 2004/0136358 A1 | 7/2004 | Hind et al. | |
| 2004/0162871 A1 | 8/2004 | Pabla et al. | |
| 2004/0215791 A1 | 10/2004 | Tsao | |
| 2004/0268322 A1 | 12/2004 | Chow et al. | |
| 2005/0120346 A1 | 6/2005 | Sprigg | |
| 2005/0141465 A1 | 6/2005 | Kato et al. | |
| 2005/0160195 A1 | 7/2005 | Bruner et al. | |
| 2005/0289266 A1 | 12/2005 | Illowsky et al. | |
| 2006/0103534 A1 * | 5/2006 | Arms et al. | 340/572.1 |
| 2006/0126524 A1 | 6/2006 | Tateson | |
| 2006/0178156 A1 * | 8/2006 | Kim | 455/466 |
| 2006/0215588 A1 * | 9/2006 | Yoon | 370/310 |

(Continued)

OTHER PUBLICATIONS

P. Levis and D. Culler: Mate: A Tiny Virtual Machine for Sensor Networks, International Conference on Architectural Support for Programming Languages and Operating Systems, San Jose, CA, USA, Oct. 2002, 11 pages.

(Continued)

*Primary Examiner*—Danh C Le

(57) ABSTRACT

A wireless sensor node can obtain (102) a wireless sensor node group affiliation pursuant to an affiliation formation process and then subsequently transmit (103) information regarding that wireless sensor node group affiliation. By one approach this affiliation formation process can comprise, at least in part, using wireless sensor node group affiliation information as corresponds to other wireless sensor nodes. Such wireless sensor node group affiliation information as corresponds to other wireless sensor nodes might be received, for example, directly from that other wireless sensor node and/or via an intermediary wireless sensor node that acts to forward such information from the other wireless sensor node.

15 Claims, 2 Drawing Sheets

U.S. PATENT DOCUMENTS

2006/0253570 A1* 11/2006 Biswas et al. ............... 709/224
2006/0271661 A1 11/2006 Qi et al.

OTHER PUBLICATIONS

H. Chan and A. Perrig: ACE: An Emergent Algorithm for Highly Uniform Cluster Formation, in Proceedings of the First European Workshop on Sensor Networks (EWSN), Jan. 2004, 16 pages.

C. Frank and K. Romer: Algorithms for Generic Role Assignment in Wireless Sensor Networks, Proceedings of the 3rd ACM Conference on Embedded Networked Sensor Systems (SenSys), Nov. 2005, 13 pages.

Liu et al.: State-Centric Programming for Sensor-Actuator Network Systems, IEEE Pervasive Computing, Oct.-Dec. 2003, pp. 50-62.

Steffan, J. et al.: Towards Multi-Purpose Wireless Sensor Networks, ICW, 2005 Systems Communications (ICW'05, ICHSN'05, ICMCS'05, SENET'05) 2005, pp. 336-341.

A. Howard, M.J. Mataricie and G.S. Sukhatma, "Mobile Sensor Network Deployment using Potential Fields: A Distributed, Scalable Solution to the Area Coverage Problem," International Symposium on Distributed Autonomous Robotics Systems, Jun. 2002.

B. Lui, P. Brass, and O. Dousse, "Mobility improves coverage of sensor networks," ACM MobiHoc, May 2005.

N. Bisnik, A. Abouzeid, and V. Isler, "Stochastic event capture using mobile sensors subject to a quality metric," ACM/ IEEE MobiCom, Sep. 2006.

Y. Zou and K. Charabarty, "Sensor deployment and target localization based on virtual forces", IEEE InfoCom, Apr. 2003.

S. Meguerdichian, F. Koushanfara, M. Potkonjak, and M.B. Srivastava, "Coverage problems in wireless ad-hoc sensor networks", IEEE InfoCom, Mar. 2001, pp. 1380-1387.

D. Tian and N.D. Georganas, "A coverage-preserving node scheduling scheme for large wireless sensor networks", ACM WSNA, Sep. 2002.

C-F Huang and Y-C Tseng, "The coverage problem in a wireless sensor network", SCM WSNA, Sep. 2003.

S. Shakkotai, R. Srikant and N. Shroff, "Unreliable sensor grids: Coverage, connectivity and diameter", IEEE InfoCom, Mar. 2003.

X. Wang, G. Xing, Y. Zhang, C. Lu, R. Pless, and C. Grill, "Integrated coverage and connectivity configuration wireless sensor networks", ACM SenSys, Nov. 2003, pp. 28-39.

S. Kumar, T.H. Lai and J. Balogh, "On k-coverage in a mostly sleeping sensor network", ACM MobiHoc, Jun. 2004, pp. 144-158.

G. Wang, G. Cao, and T.L. Porta, "Movement-assisted sensor deployment", IEEE InfoCom, Mar. 2004.

www.swarm-bot.org, Oct. 1, 2001.

B. Gerkey and M. Mataric, "A formal analysis and taxonomy of task allocation in multi-robot systems", Intl. J. of Robotics Research 23(9), Sep. 2004, pp. 939-954.

Yu, et al., MELETE: Supporting Concurrent Applications in Wireless Sensor Networks, ACM SenSys 2006, 14 pages.

Hsieh et al., "Efficient Localization in Mobile Wireless Sensor Networks," IEEE International Conference on Sensor Networks, Ubiquitous and Trustworthy Computing 2006, vol. 1, Jun. 5-7, 2006, pp. 292-297.

Chung et al., "Ubiquitous Zone (U-Zone) based Community Networking Technologies," 3rd Annual IEEE Communications Society on Sensor and Ad Hoc Communications and Networks, SECON '06, vol. 2, Sep. 28, 2006, pp. 678-683.

Han, et al., "Senor Network Software Update Management: A Survey," International Journal of Network Management, 2005, 15: pp: 283-294.

Johannes Helmig, "Windows 98 Update," Windows Networking, http//windowsnetworking.com/articles_tutorials/w98updat.html, Published Dec. 2, 2000.

Microsoft, "Getting the Most from Windows Update," Microsoft Corporation, May 7, 2002, http://technet.microsoft.com/en-us/library/cc722656.aspx.

Brian R. Copenheaver, "PCT/US2007/064138—PCT International Search Report and Written Opinion," WIPO, ISA/US, Commissioner for Patents, Alexandria, VA, USA, Nov. 16, 2007.

Athina Nickitas-Etienne, "PCT/US2007/064138—PCT International Preliminary Report on Patentability," Geneva, Switzerland, Oct. 16, 2008.

* cited by examiner

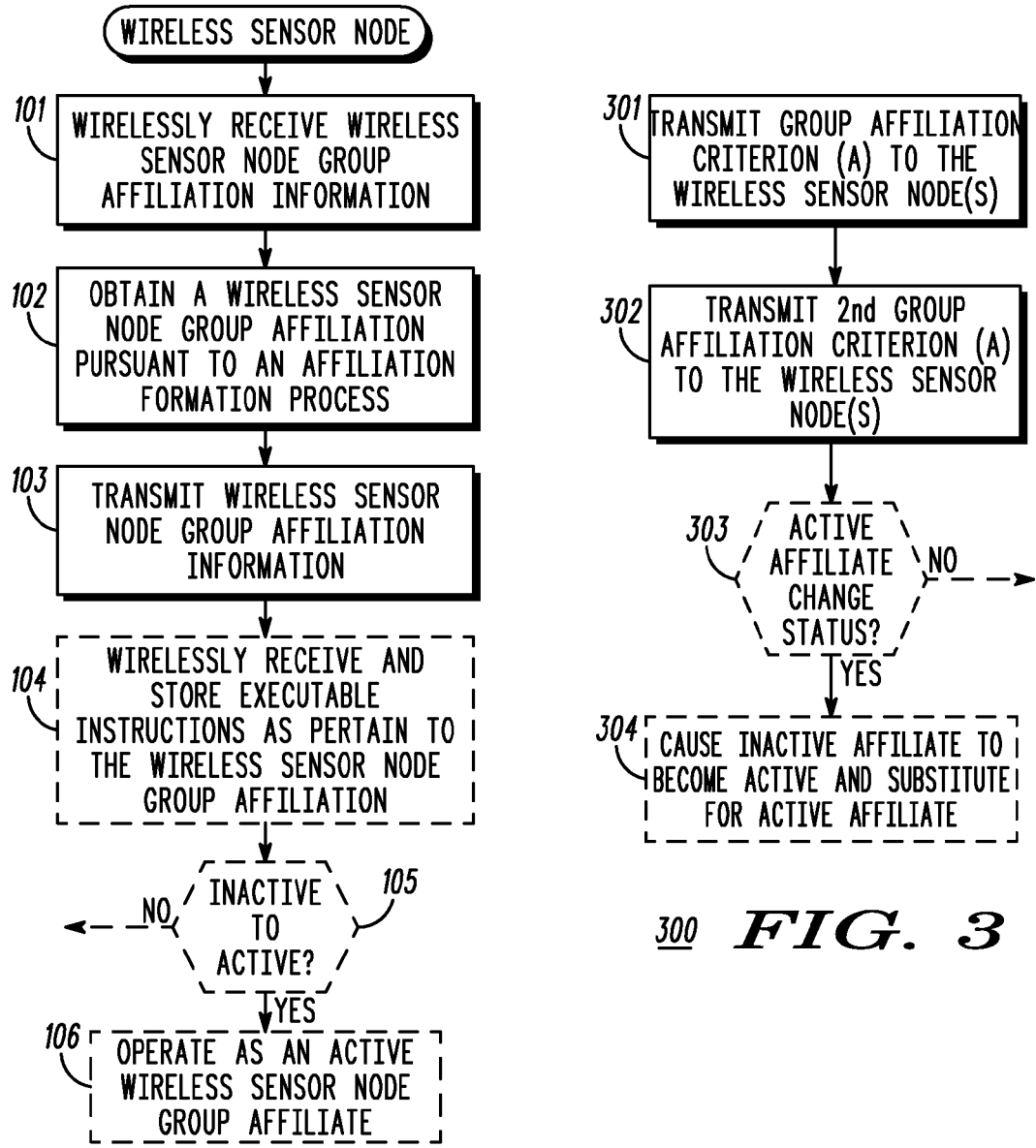
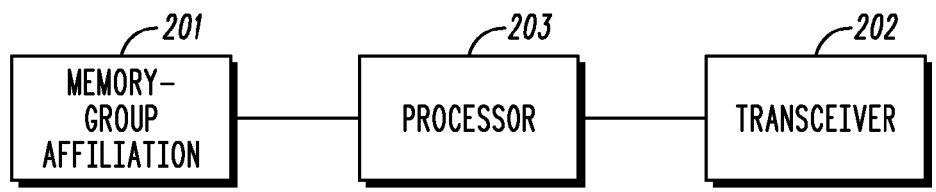

WIRELESS SENSOR NODE GROUP AFFILIATION METHOD AND APPARATUS

RELATED APPLICATIONS

This invention relates generally to WIRELESS SENSOR NODE EXECUTABLE CODE REQUEST FACILITATION METHOD AND APPARATUS as bears Ser. No. 11/278,680 as was filed on even date herewith, and METHOD AND APPARATUS TO FACILITATE AUTOMATIC SELECTION OF SOFTWARE PROGRAMS TO BE DISTRIBUTED TO NETWORK ELEMENTS as bears Ser. No. 11/276,113 as was filed on Feb. 14, 2006, the contents of which are fully incorporated herein by this reference.

TECHNICAL FIELD

This invention relates generally to wireless sensor nodes and more particularly to the configuration of and task assignment within wireless sensor node networks.

BACKGROUND

Networks comprised of wireless sensor nodes are known in the art. A plurality of wireless sensors may be distributed throughout a building, for example, to monitor various environmental circumstances of interest (such as temperature, humidity, proximal human activity, noise, motion, and essentially any other sensable condition that might occur proximal to such a sensor). In many cases at least some of these wireless sensors comprise stand-alone platforms having only limited power, memory, and computational resources. Challenges often exist, therefore, to ensure useful application of such wireless sensors while also at least attempting to extend the useful operating life of the sensor platforms themselves.

Such platforms also often have a relatively limited transmission range. To illustrate, wireless sensors operating at 2.4 GHz and using IEEE 802.15.4 signaling protocols and in compliance with transmission power guidelines set forth by the United States Federal Communication Commission often have a maximum transmission range of only about 50 meters. To accommodate this situation many networks use a mesh-like solution to permit data to be moved upstream to a collection point via any number of intervening wireless sensors that essentially act as repeaters for downstream wireless sensors.

Many such wireless sensors comprise programmable platforms. This, in turn, permits re-programming and re-tasking of already deployed wireless sensor nodes (sometimes on a relatively regular and frequent basis). In many cases, however, such reprogramming will encompass all wireless sensors as comprise a given network. This, in turn, will typically result in each re-programmed wireless sensor acting in accordance with the newly deployed tasks and behaviors.

Unfortunately, such an approach tends to increase the number of computational and/or transmission events that a given wireless sensor must support and will also typically increase the amount of total time that such a wireless sensor must remain in an active operational state. Such operational circumstances tend to accelerate power usage and hence contribute, sometimes greatly, to diminishing the operational lifetime of a given deployed wireless sensor. This, of course, can be viewed in some cases as the inevitable cost of fielding and operating such a network.

In many cases, however, it is not necessary that all of the wireless sensor nodes as comprise a given network must or should actually act to implement such re-programming. In some cases a given wireless sensor node may not possess the requisite facilities that are necessary to accomplish a given task (for example, a given wireless sensor node may lack a temperature sensor and thus may not be able to effect a temperature measurement task). In some networks such information regarding individual platform capabilities is known and can be leveraged to permit more targeted provisioning of new programming.

In other cases, however, such information may not be known. Furthermore, in many cases the task in question may be best served by wireless sensors that have been fielded in a particular way. As a simple example, when a network includes some wireless sensors that are deployed while exposed to sunlight while others are deployed in permanently shaded areas, this circumstance can be of obvious importance when implementing tasks that require that the wireless sensor be exposed to sunlight. In such a case the re-programming and re-tasking of shaded wireless sensors will generate a waste of resources.

In yet other cases an inordinate amount of redundant task support may result. For example, four wireless sensors may all be capable of supporting a given task and may also all be sufficiently close to one another that each is essentially sensing a same ambient condition. As a result, having all four such wireless sensors re-program themselves and then act in accordance with that new programming can serve to deplete, without good reason, their limited resources.

BRIEF DESCRIPTION OF THE DRAWINGS

The above needs are at least partially met through provision of the wireless sensor node group affiliation method and apparatus described in the following detailed description, particularly when studied in conjunction with the drawings, wherein:

FIG. 1 comprises a flow diagram as configured in accordance with various embodiments of the invention;

FIG. 2 comprises a block diagram as configured in accordance with various embodiments of the invention;

FIG. 3 comprises a flow diagram as configured in accordance with various embodiments of the invention.

Figure 4:
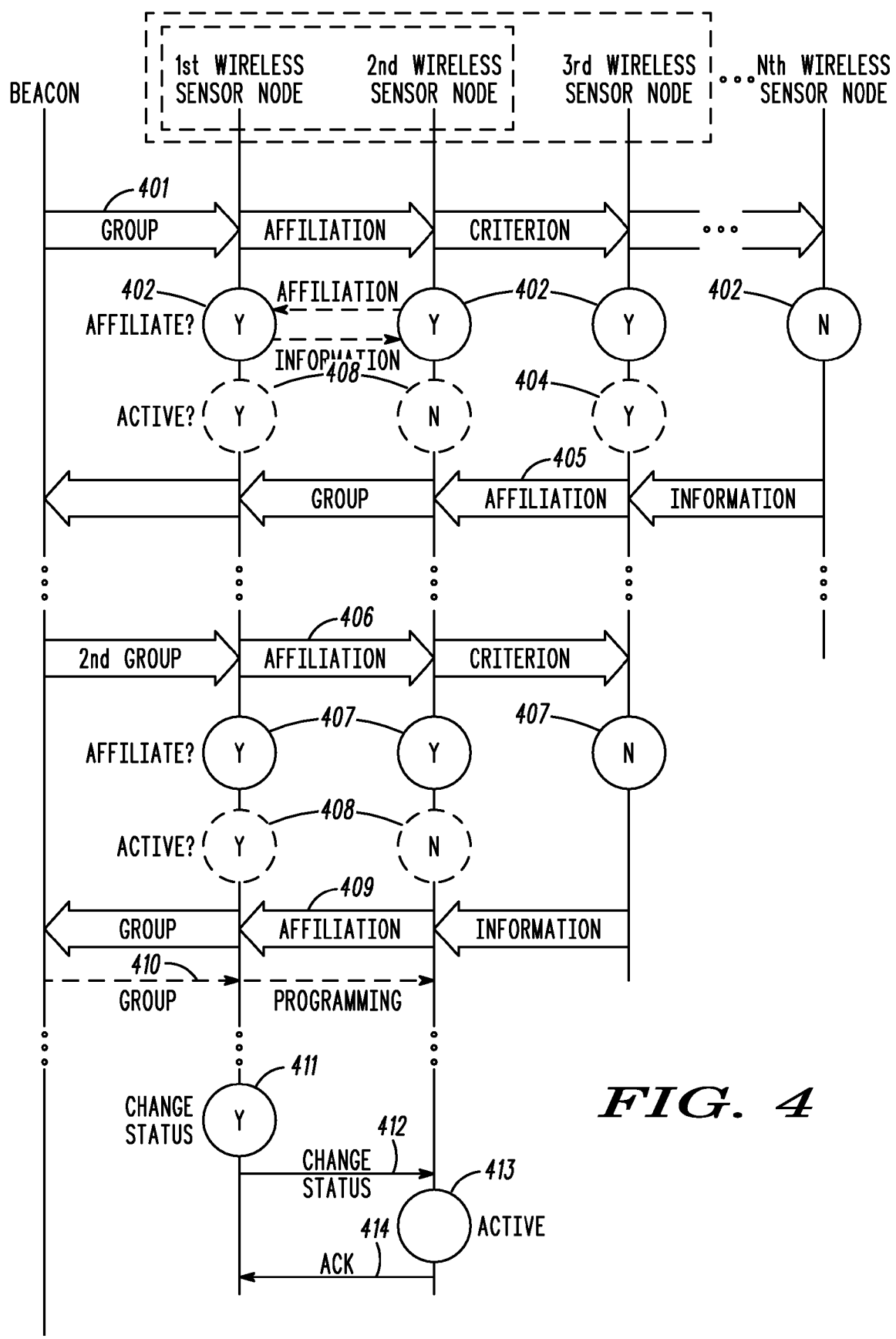
FIG. 4 comprises a call flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a wireless sensor node can obtain a wireless sensor node group affiliation pursuant to an affiliation formation process and then subsequently transmit information regarding that wireless sensor node group affiliation. By one approach this affiliation formation process can comprise, at least in part, using wireless sensor node group affiliation information as corresponds to other wireless sensor nodes. Such wireless sensor node group affiliation information as corresponds to other wireless sensor nodes might be received, for example, directly from that other wireless sensor node and/or via an intermediary wireless sensor node that acts to forward such information from the other wireless sensor node.

Such a process can be repeated as desired to create one or more sub-groups. So configured the wireless sensor nodes as comprise a given network can effectively select whether to receive (and/or to effect) executable instructions as pertain to the group affiliation(s) in question. This, in turn, can lead to increased efficiency with respect to overall resource deployments within a given wireless sensor node network.

By one approach, if desired, these processes can be further embellished to accommodate having a wireless sensor node that has a particular group affiliation and that receives or otherwise has access to corresponding programming determine whether to adopt an active or inactive role or status with respect to implementation of that programming. This, in turn, permits allowing one or more wireless sensor nodes that are capable of effecting a particular task to not effect that task when inactive but to remain available for an active role should that become necessary. That latter circumstance can occur, for example, if and when an active wireless sensor node for that group becomes unable or otherwise unavailable to carry out the task in question.

So configured, considerable improvement can be expected with respect to encouraging a more efficient use of a deployed wireless sensor node network without a significant corresponding decrease in effectiveness. Such wireless sensor nodes remain available for re-tasking as before, but now the average anticipated operational life span of these wireless sensor nodes can be expected to improve.

These and other benefits may become clearer upon making a thorough review and study of the following detailed description. Referring now to the drawings, and in particular to FIG. 1, a wireless sensor node can effect an illustrative corresponding process 100 by obtaining 102 a wireless sensor node group affiliation pursuant to an affiliation process. Such an affiliation process can be initiated by and/or at least partially based upon the receipt of group affiliation criterion (or criteria) as may have been sourced by a network beacon or other source of choice.

This step 102 can also comprise, by one approach, forming the wireless sensor node group affiliation as a function, at least in part, of other wireless sensor node group affiliation information as corresponds to at least one other wireless sensor node (for example, wireless sensor node group affiliation information as has optionally been wirelessly received 101 from another wireless sensor node). Accordingly, and again optionally, this step can comprise transmitting information wireless sensor node group affiliation information during the affiliation formation process itself to thereby permit other wireless sensor nodes to themselves make a more informed decision in this regard.

This process 100 then provides for transmitting 103 information regarding that wireless sensor node group affiliation subsequent to the affiliation formation process. Hence, this transmission should not be confused with the earlier mentioned optional transmission of affiliation information that might be exchanged amongst wireless sensor nodes as part of the affiliation formation process itself In a typical application setting this transmission 103 is intended, at least in part, to convey such information to a network data collection point. This, in turn, permits a network-wide view to be formed with respect to those wireless sensor nodes that are now affiliated with the wireless sensor node group at issue.

If desired, the above-described steps can be repeated to identify and form sub-groups as desired. As one simple example, a first group may be formed based upon an affiliation criterion that requires a light detecting capability. These steps can then be repeated to then identify those wireless sensor nodes that are now affiliated with the light-detecting-capability group that are also presently being exposed to ambient light. This, in turn, can permit such wireless sensor nodes to affiliate themselves with a corresponding group of wireless sensor nodes that have a light detecting capability and that are presently exposed to light. It is not necessary, however, that a sub-group only comprise a subset of a given earlier identified group. In fact, formation of a subsequent group can actually lead to increasing the size of the resultant group.

This process 100 will then further accommodate, if desired, the wireless reception and storage 104 of executable instructions as pertain to the wireless sensor node group affiliation. Such executable instructions may be initially sourced, for example, by one or more data beacons for the network. In a typical application setting these executable instructions will likely pertain to a program that relates in some way to the affiliation criteria that served to inform the affiliation process itself. For example, and to continue the simple illustration presented above, executable instructions to cause affiliated wireless sensor nodes to take a reading regarding the intensity of local light conditions could now be distributed to those wireless sensor nodes that are already known to have light detecting capability and that are currently detecting at least some level of light.

These teachings will therefore been seen and understood to aid in avoiding the reprogramming and subsequent tasking of wireless sensor nodes that are intrinsically and/or situationally unsuited to a particular task. This, in turn, can aid in conserving the resources of such wireless sensor nodes. These teachings may also be further employed and leveraged, however, to aid with resource conservation as concerns wireless sensor nodes that are otherwise suited to a particular need.

To illustrate, this process 100 can further optionally accommodate permitting a wireless sensor node to determine 105 whether that self-adopted wireless sensor node group affiliation should be conducted in an active mode or state of operation or in an inactive mode or state of operation. Upon determining that an active state is appropriate this process 100 can then provide for operating 106 that wireless sensor node as an active wireless sensor node with respect to that particular group affiliation.

Such a capability will permit, for example, a group of similarly situation wireless sensor nodes as comprise a part of a same group affiliation to avoid needlessly redundant operation that will unnecessarily deplete the resources of at least some of those wireless sensor nodes. To illustrate, and again to continue the above example, a group of three co-located wireless sensor nodes that each possess light detecting capability and that are each presently exposed to light can be aware of one other via the previously mentioned transmissions of affiliation information. As noted above, wireless sensor nodes typically have only a limited transmission range. This, in turn, can be used to determine that a directly received transmission is likely emanating from a relatively proximal neighboring wireless sensor node.

Accordingly, one of the three wireless sensor nodes in this example can operate in a presently active mode with respect to that group affiliation while the remaining two wireless sensor nodes can operate in an inactive mode. So configured, all three wireless sensor nodes can receive and store the executable instructions that are intended for that group. In this example, however, only the active wireless sensor node will employ that programming to effect the group characterizing task. The remaining two inactive wireless sensor nodes can remain quiescent in this regard.

The active and inactive role can be switched amongst such wireless sensor nodes using this process 100 if desired. By one illustrative approach, for example, the wireless sensor nodes can each sequentially assume an active status in a round robin manner to thereby distribute the resource depletion impact of their tasks in a more even manner. By another illustrative approach, a presently active wireless sensor node can remain active unless and until its resources become depleted to a point where a handoff of the task to another wireless sensor node within the group becomes appropriate.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

In this illustrative embodiment, the wireless sensor node 200 comprises a memory 201 and a transmitter (represented here as a transceiver 202 that also provides reception capability). The memory 201 serves to store, at least in part, a wireless sensor group affiliation as was determined during an affiliation formation process as described above. The transmitter in turn serves to provide an output to transmit a post-affiliation formation process message regarding that wireless sensor node group affiliation as described above. Such a message can comprise, for example, identification of the group affiliation itself and/or information regarding the active or inactive nature of that affiliation. Such a transmitter can also serve to transmit the optional messages that may be provided as a part of the affiliation formation process as was also described above.

If desired, these elements may be operably coupled via and to, for example, a processor 203. This processor 203 may be configured and arranged (via, for example, programming) to effect some or all of the process steps described above. For example, this process 203 can be programmed to facilitate development of the wireless sensor node group affiliation as per an affiliation formation process and also to cause transmission of a message regarding that wireless sensor node group affiliation via the transmitter 202.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

A network comprising wireless sensor nodes of this (or other compatible) type and configured in accordance with the teachings set forth herein can be readily leveraged via a process 300 such as that set forth in FIG. 3. By such a process 300 a network source of choice can transmit 301 one or more group affiliation criterion to a plurality of such wireless sensor nodes.

Such a transmission can comprise a general non-discriminating broadcast or can be more specifically targeted using any of a variety of known techniques in this regard. For example, by one approach, any of a variety of so-called flooding techniques could be employed to disseminate this initial transmission within a multi-hop network. Such an approach may be particularly appropriate when a specific application setting comprises a multi-hop network where many (or all) broadcasts only reveal the state of nodes as are located within a local neighborhood or as may be confined to a specific neighbor list. It may also be appropriate to take possible transmission errors into account when effecting such an approach. This can involve, for example, providing partially or fully redundant transmissions and/or analyzing at least portions of subsequent neighbor node transmissions.

The recipient wireless sensor nodes can then use this group affiliation criterion to facilitate their own affiliation formation process (for example, as described above).

This process 300 can then provide for transmission 302 of a second group affiliation criterion (or criteria). Again, this transmission can be generally directed or can be more specifically targeted as desired (for example, this second transmission can be directed to only those wireless sensor nodes that are presently affiliated with the previously formed group). Those skilled in the art, however, will understand and appreciate that such an approach (iteratively applied as often as necessary or appropriate to achieve the desired results) can be employed to form a first group of candidate wireless sensor nodes that are potentially useful to effect a particular task and to then form one or more subgroups within that first group to more particularly and perhaps efficiently and effectively address and support that task. As described above, one might also produce complementary groups rather than mathematically proper subgroups during these iterative group formations. In this case, the transmission would likely be generally directed rather than specifically targeted.

If desired, such a process 300 can further optionally comprise adopting in the first instance or determining 303 to change one's active/inactive affiliation status. Upon determining 303 to continue without change this process 300 can then simply proceed with such other steps or actions as may be appropriate in a given application setting. Upon determining 303, however, to change status this process 300 can then optionally provide for causing 304, for example, an inactive affiliate of the wireless sensor node group subset to change to an active status and further, if desired, to thereby substitute for a previously active affiliate.

Referring now to FIG. 4, a number of illustrative example scenarios will be provided. In a first scenario, a network source (such as, but not limited to, a beacon) transmits a message 401 comprising a group affiliation criterion (or criteria) to the various constituent wireless sensor nodes as comprise a corresponding wireless sensor network. As per these teachings these recipient wireless sensor nodes then use this group affiliation criterion to determine 402 a corresponding group affiliation status. This affiliation determination can comprise, as disclosed above, the provision, receipt, and/or exchange of affiliation information 403 with, for example, neighboring wireless sensor nodes. This can be useful for various purposes. As one example, proper use and evaluation of the group affiliation criterion may require knowledge regarding neighboring wireless sensor nodes. In the illustrative embodiment depicted, the first through the third wireless sensor nodes have determined 402 that they meet the group affiliation criterion and hence are affiliated with that group. The remaining wireless sensor nodes (represented here by an Nth wireless sensor node) have determined 402 otherwise.

As noted above, if desired, the wireless sensor nodes that are now affiliated with this group can also then determine 404 whether to adopt an active or an inactive status with respect to that group. In this illustrative example, the first and the third wireless sensor node have elected to adopt an active status while the second wireless sensor node has adopted an inactive status in this regard.

These wireless sensor nodes then source transmission messages to inform the beacon (or other network resource of choice) regarding their group affiliation. By one approach (and as is suggested by the illustration provided in FIG. 4) every wireless sensor node may provide such a response. By another approach, however, it may be desirable to have only those wireless sensor nodes that have an affirmative group affiliation transmit such an indication.

For some purposes these steps may be sufficient to identify a sufficient body of wireless sensor nodes to accomplish a desired result. In other cases, however, it may be helpful to further delineate and define the group to facilitate the task at hand. In such a case, a message 406 comprising a second group affiliation criterion (or criteria) may be directed to at least the wireless sensor nodes as comprise the first group formed via the above steps. In such a case, and as before, the recipient wireless sensor nodes can then employ such a criterion to again determine their group affiliation 407 and their status 408 with respect to that affiliation.

In this example, the first and second wireless sensor nodes determine 407 to be affiliated in the second group while the third wireless sensor node determines otherwise. Also in this example the first wireless sensor node determines 408 to serve in that group with active status while the second wireless sensor node determines to participate in that group with inactive status. These wireless sensor nodes (again, either all such nodes or some subset thereof) then respond to the network by sourcing a message 409 to express their group affiliation determinations (and possibly, if desired, their active/inactive status with respect to a particular group affiliation).

In some cases the wireless sensor nodes may be pre-provisioned with the necessary capabilities they require to effect the desired task. In other cases the network can then optionally deploy this information to provide targeted group programming information 410 for the resultant group. This can comprise, for example, specific executable code and/or parameters to be used to cause a particular task to be carried out in a particular way by the recipient wireless sensor nodes as comprise affiliates of the second group.

As noted, in this example the first wireless sensor node comprises an active group affiliate while the second wireless sensor node comprises an inactive group affiliate. By one approach the second wireless sensor node received and accepted the aforementioned group programming 410 notwithstanding its inactive status. The second wireless sensor node, however, does not actively use that programming and instead remains in a quiescent state in that regard.

As per these teachings, however, such a status can be changed if desired. In this illustrative example, the first wireless sensor node makes a determination 411 that it should change from active to inactive status. This might reflect, for example, diminishing power reserves, growing problems with a reporting transport channel, a loss of sensable conditions, and so forth. The first wireless sensor node, under such circumstances, can transmit a message 412 to the second wireless sensor node to signal that the first wireless sensor node is going to change to inactive status and/or that the second wireless sensor node should change to active status.

The second wireless sensor node can then respond to such a message 412 by switching 413 to an active state as per these teachings. If desired, this can be accompanied by a message 414 that acknowledges to the first wireless sensor node that such a change will be (or has been) made. It may also be useful in at least some application settings to also transmit a message to the network to indicate that such events have transpired.

So configured, a network of wireless sensor nodes can be readily selected for reconfiguration and/or re-tasking as a function of various criteria of interest. Various advantages may be obtained by employing a series of sequentially applied criteria (yielding potentially smaller, and/or refined in their purpose, subgroups with each iteration). These advantages include, but are not limited to, a potential savings of computational and/or power resources for at least some of the wireless sensor nodes.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   at a wireless sensor node:
   obtaining a wireless sensor node group affiliation pursuant to an affiliation formation process wherein the affiliation process is based on at least one of sensing facilities and fielded circumstances for the wireless sensor node;
   transmitting information regarding that wireless sensor node group affiliation subsequent to the affiliation formation process;
   determining when to serve in the group in active status and when to participate in the group in inactive status.

2. The method of claim 1 wherein obtaining a wireless sensor node group affiliation pursuant to an affiliation formation process comprises, at least in part, forming the wireless sensor node group affiliation as a function, at least in part, of other wireless sensor node group affiliation information as corresponds to at least one other wireless sensor node.

3. The method of claim 2 further comprising:
   wirelessly receiving the other wireless sensor node group affiliation information.

4. The method of claim 3 wherein wirelessly receiving the other wireless sensor node group affiliation information from at least one of:
   the at least one other wireless sensor node;
   an intermediary wireless sensor node that is forwarding the other wireless sensor node group affiliation information from the at least one other wireless sensor node.

5. The method of claim 1 wherein obtaining a wireless sensor node group affiliation pursuant to an affiliation formation process further comprises transmitting information regarding that wireless sensor node group affiliation during the affiliation formation process.

6. The method of claim 1 further comprising:
   wirelessly receiving and storing executable instructions as pertain to the wireless sensor node group affiliation.

7. The method of claim 1 wherein the wireless sensor node group affiliation comprises an inactive wireless sensor node group affiliation.

8. The method of claim 7 further comprising:
   determining that the wireless sensor node group affiliation should be changed from the inactive wireless sensor node group affiliation to an active wireless sensor node group affiliation;
   operating as an active wireless sensor node group affiliate.

9. A method comprising:

transmitting a first at least one group affiliation criterion to a plurality of wireless sensor nodes to facilitate affiliation determination by at least some of the plurality of wireless sensor nodes as to their affiliation with respect to a first wireless sensor node group wherein the affiliation determination is based on at least one of sensing facilities and fielded circumstances for individual ones of the plurality of wireless sensor nodes;

subsequent to transmitting the first at least one group affiliation criterion, transmitting a second at least one group affiliation criterion to the plurality of wireless sensor nodes to facilitate affiliation determination by at least some of the plurality of wireless sensor nodes as to their affiliation with respect to a second wireless sensor node group as a function, at least in part, of information regarding the first wireless sensor node group, wherein the affiliation determination is based on at least one of sensing facilities and fielded circumstances for individual ones of the plurality of wireless sensor nodes.

10. The method of claim 9 wherein the information regarding the first wireless sensor node group comprises information regarding self-affiliation with the first wireless sensor node group.

11. The method of claim 9 wherein the information regarding the first wireless sensor node group comprises information regarding other node-affiliation with the first wireless sensor group.

12. The method of claim 9 wherein the information regarding the first wireless sensor node group comprises information regarding non-affiliation with the first wireless sensor node group.

13. The method of claim 9 wherein the information regarding the first wireless sensor node group comprises information regarding at least one of:

active status: and inactive status;

affiliation with the first wireless sensor node group.

14. The method of claim 9 wherein the second wireless sensor node group comprises a subset of the first wireless sensor node group.

15. The method of claim 9 further comprising:

determining that an active affiliate of the second wireless sensor node group should change its active status;

causing an inactive affiliate of the second wireless sensor node group to change to active status and thereby substitute for the active affiliate.

* * * * *